United States Patent

[11] 3,604,655

[72] Inventor David P. Jones
Detroit, Mich.
[21] Appl. No. 832,353
[22] Filed June 11, 1969
[45] Patented Sept. 14, 1971
[73] Assignee Allied Chemical Corporation
New York, N.Y.

[54] INERTIA RETRACTOR
4 Claims, 7 Drawing Figs.
[52] U.S. Cl. ........................................ 242/107.4
[51] Int. Cl. ........................................ B65h 75/48
[50] Field of Search .......................... 242/107,
107 SB, 107.4, 107.5, 107.6; 297/388; 280/150 SB

[56] References Cited
UNITED STATES PATENTS

| | | | |
|---|---|---|---|
| 3,412,952 | 11/1968 | Wohlert et al. | 242/107.4 |
| 3,446,454 | 5/1969 | Kovacs et al. | 242/107.4 |
| 3,450,368 | 6/1969 | Glauser et al. | 242/107.4 |

Primary Examiner—Stanley N. Gilreath
Assistant Examiner—Werner H. Schroeder
Attorneys—Jonathan Plaut and Marvin Bressler ABSTRACT: A safety seatbelt retractor having an actuator which releases a spring-biased pawl to lock the retractor reel in response to certain belt motions.

INVENTOR
DAVID P. JONES

INERTIA RETRACTOR

BACKGROUND OF THE INVENTION

I. Field of the Invention

This invention relates to safety seatbelt retractors, and more particularly to those retractors which are normally unlocked when the belt is extended and coupled to the user, but automatically locked in response to certain emergency conditions.

II. Description Of The Prior Art

Emergency-locking seatbelt retractors usually have a reel which is connected to the belt for retraction. The reel is normally unlocked even though the belt is buckled about the user, thereby allowing him to perform normal body motions within the vehicle. A locking device, connected to a suitable actuator for sensing certain vehicle conditions, locks the retractor to prevent belt extension in response to such emergency conditions.

A common form of actuator employs an inertia member which is mounted on the retractor reel in such a manner that it moves with the reel whenever the reel is rotated at a normal rate, however, should the reel be rotated at an acceleration associated with the belt being suddenly extended, as during a vehicular collision, the inertia member is displaced with respect to the reel. This displacement is employed to actuate the locking device.

A common form of locking device comprises a pair of circular ratchets carried by the reel, and a pawl which is mounted on the retractor support for movement toward and away from a locking position in which it engages the ratchets to prevent reel rotation in the direction in which the belt is extended. Usually the connection between the reel and the pawl is such that the pawl is moved, in response to the displacement of the inertia member, by a connection to the reel. The reel's motion is employed to move the pawl. Since the pawl is actuated in response to conditions in which the reel is being rotted at a highly accelerated rate, the pawl is moved toward its locking position with a substantial acceleration until it engages the ratchets to stop the reel. The disadvantage of such a connection is that unless carefully designed the pawl may be difficult to release.

SUMMARY OF THE INVENTION

The broad purpose of the present invention is to provide an emergency locking retractor in which the locking pawl is moved toward either its locking position or its release position in motions which are independent of the reel's motion. In the preferred embodiment, a spring connects the pawl to the retractor support. A dog and ratchet mechanism mounted on the reel supports the spring such that the pawl is urged toward either its locking position or its release position depending upon the reel's direction of rotation and the position of an inertia actuator.

The pawl is normally in its release position in which it allows the reel to rotate in either direction. When the reel is rotated in the direction in which the belt is unwound at a rate sufficient to displace the inertia actuator, the dog responds by releasing the pawl for motion toward its locking position by the spring. The dog then is responsive to reel rotation in the opposite, winding direction, in a manner in which the pawl is released for motion toward its release position under the spring's influence. Thus, although the pawl's motion is initiated by the actuator, its rate of motion depends upon the spring's characteristics.

Still further objects and advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figures 1, 2, 3:
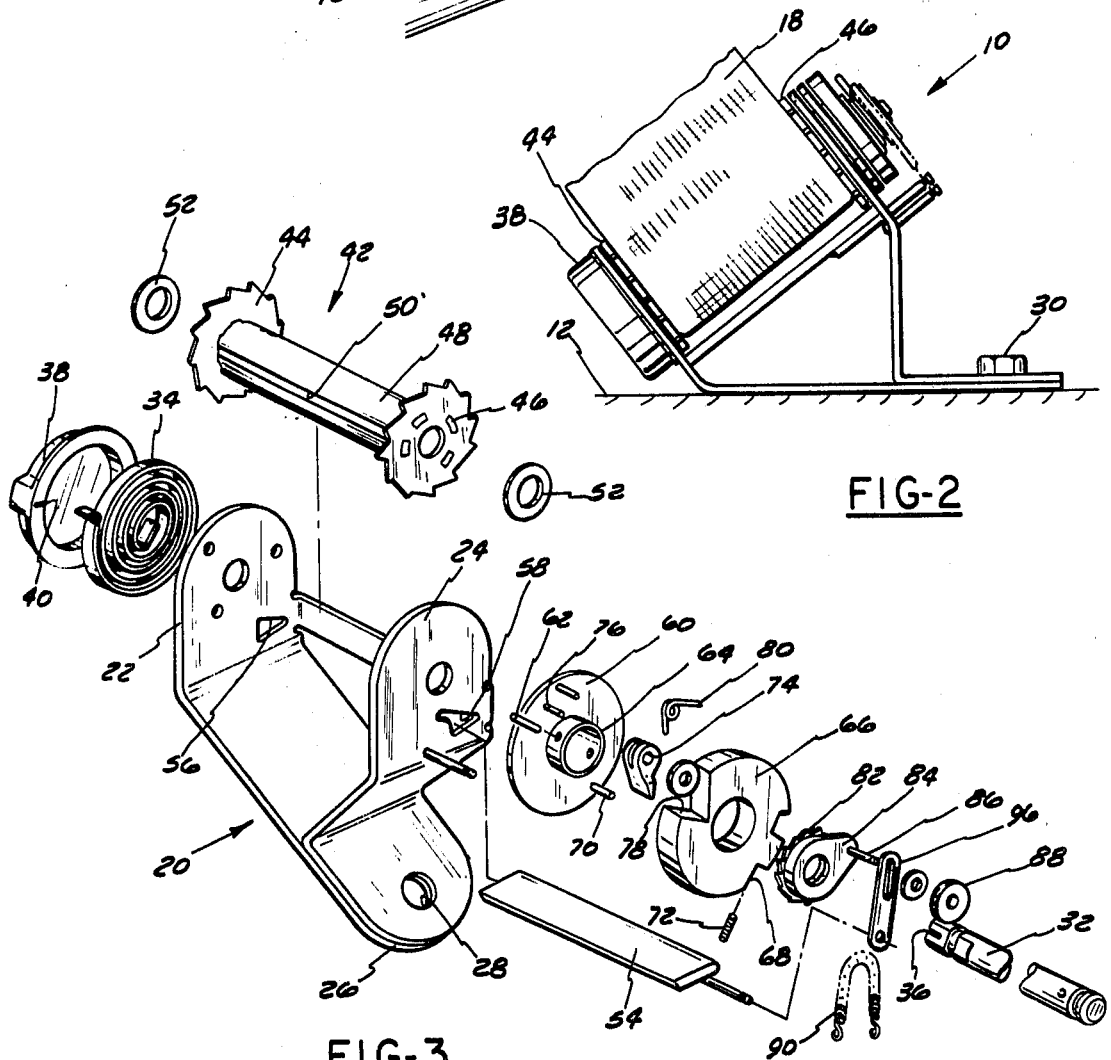
FIG. 1 is a perspective view showing a seatbelt retractor, illustrating the preferred embodiment of the invention, mounted in the passenger compartment of a vehicle.
FIG. 2 is an enlarged elevational view of the preferred retractor with its cover removed.
FIG. 3 is an exploded view of the preferred retractor.

Now referring to FIGS. 1 and 2, a preferred seatbelt retractor 10 is shown as mounted on the floor panel of a vehicle 12, adjacent a seat assembly 14. A cover 16 encloses the retractor 10, and has an opening for a safety seatbelt 18. Belt 18 can be extended from the retractor 10 and connected to a suitable fitting (not shown) on the opposite side of the seat assembly 14, in the manner well known to those skilled in the art. The retractor 10 is employed to retract the belt 18 toward a wound-up position within the cover 16.

Figure 4:
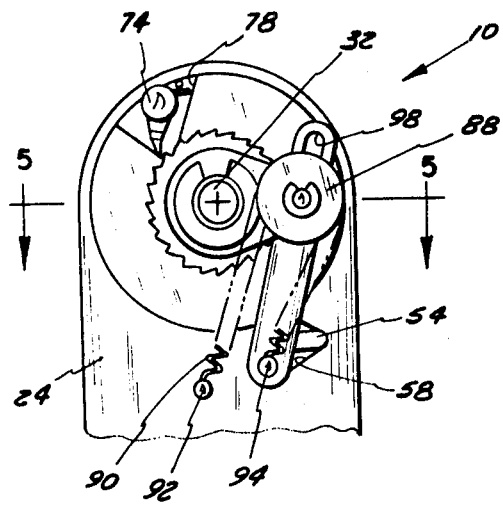
FIG. 4 is an enlarged elevational view showing the retractor locking means.
Figure 5:
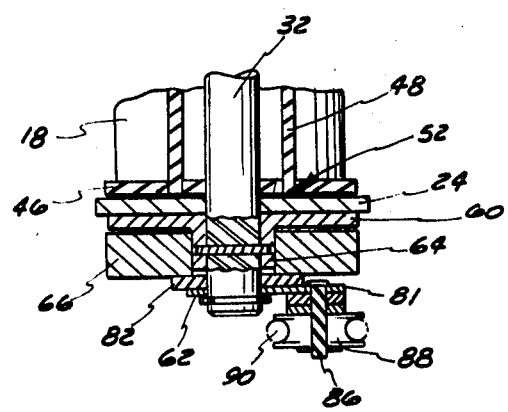
FIG. 5 is a fragmentary view taken along lines 5—5 of FIG. 4.

Now referring to FIGS. 3, 4 and 5, the retractor 10 includes the support 20 which is bent to form a pair of parallel sides 22 and 24 and a base 26. The base 26 has an opening 28 for receiving a fastener 30 which secures the support to the vehicle 12. A shaft 32 is rotatably mounted on the support sides 22 and 24 with its ends extending beyond both of the sides. A spiral spring 34 is mounted on one end of the shaft 32 which has a slot 36 for receiving the inner end of the spring.

A housing 38, mounted on the support side 22, encloses the spring 34 and has a slot 40 for receiving the outer end of the spring in such a manner that the spring biases the shaft 32 toward rotation in the direction in which the belt 18 is retracted. However, the spring 34 allows the shaft 32 to be rotated in the opposite direction as the belt 18 is extended.

The belt 18 is connected to the shaft 32 and wound about a reel 42. Reel 42 is composed of a pair of circular ratchets 44 and 46 which are connected together by a sleeve 48. The distance between the ratchets 44 and 46 is sufficient to accommodate the width of the belt 18. The ratchet 44 is fixedly connected to the shaft 32 so that the reel and the shaft rotate together.

The belt is connected to the shaft by being passed through a slot 50, around the shaft 32, out of the slot and then being stitched to itself to form a permanent loop. A pair of plastic washers 52 are mounted on the shaft 32 between the ratchets 44 and 46 and their respective support sides to provide a sliding engagement between the reel and the support as the reel is rotated to extend or retract the belt.

Figure 6:
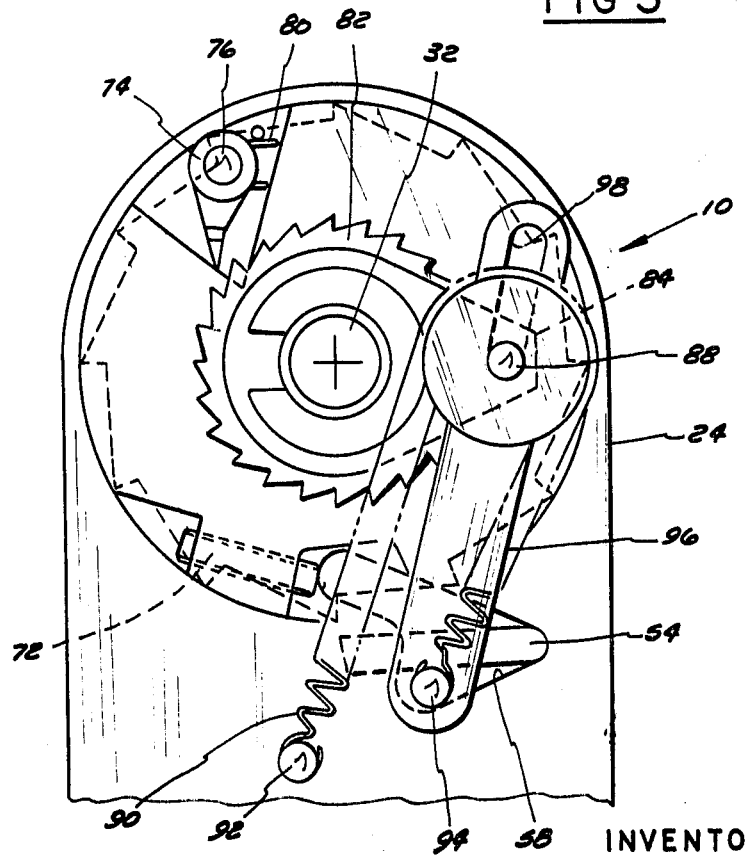
FIG. 6 is an enlarged view showing the locking means in its release position with certain components being shown in phantom.
Figure 7:
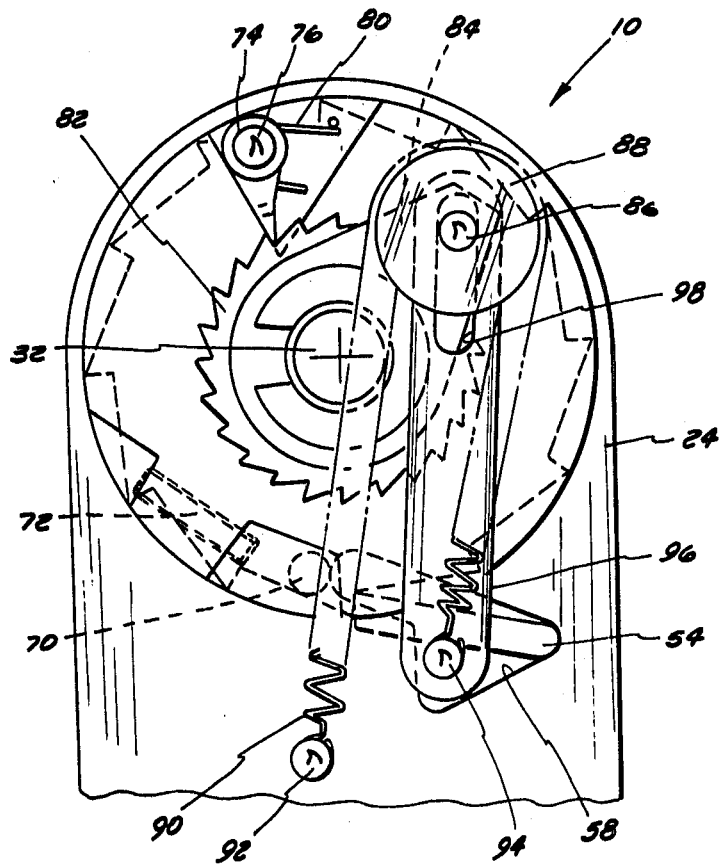
FIG. 7 is a view similar to FIG. 6 but showing the locking means in its locking position.

A pawl 54 is mounted in a pair of openings 56 and 58 formed in support sides 22 and 24 respectively. The pawl 54, which functions as a locking member, is movable between a lower release position, as illustrated in FIG. 6 in which it allows the reel to be rotated in either direction, and a raised, locking position in which it engages the ratchets 44 and 46 to prevent rotation of the reel in its unwinding direction, as illustrated in FIG. 7. The means for controlling the motion of the pawl 54 include a wheel 60 which is mounted on the shaft 32. A pin 62 locks the wheel 60 to the shaft as shown in FIG. 5. The wheel 60 has a boss 64 for slidably supporting an inertia member 66. The inertia member 66 has a peripheral opening 68 for receiving a stop 70 carried by the wheel. A setscrew 72 is mounted on the inertia member for adjusting the rotational displacement between the inertia member 66 and the wheel 60. It is to be understood that the inertia member 66 functions as an actuator with its rotational displacement with respect to the wheel 60 being employed as a means for actuating the motion of the pawl 54.

A dog 74, carried on a pin 76 of the wheel 60, is disposed in an opening 78 of the inertia member. The dog 74 is pivotal between an outer position illustrated in FIG. 6 and an inner position illustrated in FIG. 7. A spring 80 biases the dog 74 toward its normal, outer position and the inertia member 66 toward the position in which it is normally disposed as the reel 42 is rotated either in its winding direction or in its unwinding direction at a relatively low rate of acceleration. The mass of the inertia member 66 is such that as the reel is rotated in the unwinding direction, or counterclockwise as viewed in FIGS. 6 and 7, the wheel 60 tends to be rotated in the counterclockwise direction with respect to the inertia member. The spring 80 prevents relative rotation between the reel and the inertia member unless the reel is rotated with at least a predetermined acceleration in the unwinding direction. The wheel 60 is then rotated in the counterclockwise direction with respect to the inertia member thereby pivoting the dog 74 toward its inner position.

A ratchet 82 is mounted on the shaft 32 adjacent the inertia member 66, and has an arm 84. A pin 86 is carried on the arm 84 and supports a pulley 88. A spring 90 has one end connected by a pin 92 to the support side 24, and its opposite end connected by a pin 94 to the pawl 54. The spring's midsection is mounted on the pulley 88. An elongated slide 96 has one end connected to the pin 94 and its opposite end provided with a slot 98 for receiving the pin 86 of the ratchet arm.

In operation, whenever the dog 74 is in its outer position, the ratchet 82 is free for rotation with respect to the shaft 32. In this position of the dog, the spring 90 biases the pulley 88 to a position in which the pin 86 abuts the end of the slot 98 and thereby biases the pawl 54 toward its release position. When the inertia member 66 is displaced with respect to the wheel 60, in response to a sudden rotational acceleration of the reel 42 in the unwinding direction, the dog 74 is pivoted toward the ratchet 82 as illustrated in FIG. 7.

When the dog 74 is engaged with ratchet 82, rotation of the shaft in the unwinding or counterclockwise direction rotates the ratchet 82 to raise pin 86 in the slot 98 of the slide thereby releasing pawl 54 for motion toward its locking position. As the ratchet 82 is rotated by the reel, the pulley 88 is moved away from the pawl to extend the spring 90 which biases the pawl toward the ratchets 44 and 46 to stop further rotation of the reel in its unwinding direction.

When the pawl 54 is in its locking position, as shown in FIG. 7, reel rotation in the winding direction will cause the ratchet 82 and the inertia member 66 to rotate together until the pin 86 bottoms in the slot 98. This prevents further ratchet rotation so that further reel rotation disengages the dog 74 which then pivots toward its outer position and returns the inertia member 66 toward its normal position with respect to the reel.

As the dog 74 becomes disengaged from ratchet 82, the spring 90 then returns the pawl 54 down toward its release position thereby releasing the reel for rotation in its unwinding direction. Thus, both the release motion as well as the locking motion of the pawl is actuated by the reel. However, after each motion is actuated, the spring 90 provides the moving force.

It can further be seen that the slot 98 allows the reel to be rotated in a winding direction a certain distance before it is unlocked. Thus, when the reel is locked during an emergency in response to a sudden belt extension, it remains locked unless at least a predetermined amount of the belt is retracted thereby preventing unlocking before the condition which produced the belt motion has passed.

Having described my invention, I claim:

1. In a vehicle safety seatbelt system, the combination comprising:
   a support
   a reel rotatably mounted on the support;
   a belt connected to the reel so as to be extended as the reel is rotated in an unwinding direction, and to be retracted as the reel is rotated in the opposite, winding direction;
   an actuator mounted on the reel to respond to certain accelerated reel motions in the unwinding direction;
   a locking member movably mounted on the support for motion between a locking position to prevent reel rotation in the unwinding direction and a second position to allow reel rotation;
   bias means mounted on the support for urging the locking member toward said first and second positions; and
   dog means pivotably disposed in an opening in the actuator for connecting the locking member to the actuator, said dog means cooperating with an intermediary member having mounted thereon pin-in-slot means connected to said locking member for automatically moving the locking member to its locking position in response to the reel being rotated with said accelerated motions, and automatically moving the locking member to its release position in response to reel rotation in the winding direction.

2. The combination as defined in claim 1, in which said actuator includes an inertia member mounted on the reel so as to be movable thereon in accordance with certain rotational accelerations of the reel on the support.

3. The combination as defined in claim 2, including means for controlling the rotational displacement of the actuator with respect to the reel.

4. The combination as defined in claim 1, in which the actuator is movable with respect to the locking member at such times as the locking member is disposed to prevent reel rotation in the unwinding direction.